United States Patent [19]
Chen et al.

[11] Patent Number: 5,548,965
[45] Date of Patent: Aug. 27, 1996

[54] MULTI-CAVITY EVAPORATOR

[75] Inventors: Limin Chen, Dix Hills; Arthur J. Radichio, Hempstead, both of N.Y.

[73] Assignee: Spectronics Corporation, Westbury, N.Y.

[21] Appl. No.: 455,235

[22] Filed: May 31, 1995

[51] Int. Cl.⁶ ....................................................... F25D 3/00
[52] U.S. Cl. ................................ 62/66; 62/293; 137/13; 137/251.1; 165/80.1
[58] Field of Search ...................... 62/66, 293; 165/80.1; 137/13, 251.1, 828

[56] References Cited

U.S. PATENT DOCUMENTS

| | | | |
|---|---|---|---|
| 3,280,389 | 10/1966 | Martin | 165/80.1 X |
| 3,742,723 | 7/1973 | Grise | 62/293 X |
| 4,112,706 | 9/1978 | Brister | 62/293 X |
| 4,267,699 | 5/1981 | Bahrenburg | 62/293 X |
| 4,309,875 | 1/1982 | Radichio | 62/66 |
| 4,416,118 | 11/1983 | Brister | 62/293 X |
| 4,433,556 | 2/1984 | Brady | 62/293 |
| 4,492,095 | 1/1985 | Brister | 62/293 |
| 4,944,161 | 7/1990 | Van Der Sanden | 62/293 |

FOREIGN PATENT DOCUMENTS

0145114B1  3/1989  European Pat. Off. .

Primary Examiner—William E. Tapolcal
Attorney, Agent, or Firm—Seidel, Gonda, Lavorgna & Monaco, P.C.

[57] ABSTRACT

An evaporator has an outer surface and inner chamber. The outer surface having at least two pipe receiving surfaces and a pair of ends. The evaporator has a bore extending from one of the ends to the inner chamber. A tube extends into the bore sealing the chamber, such that a refrigerant flows into the inner chamber through an inner tube and out of the inner chamber through the tube. Each of the pipe receiving surfaces having a distinct surface adapted for receiving different size pipes.

15 Claims, 3 Drawing Sheets

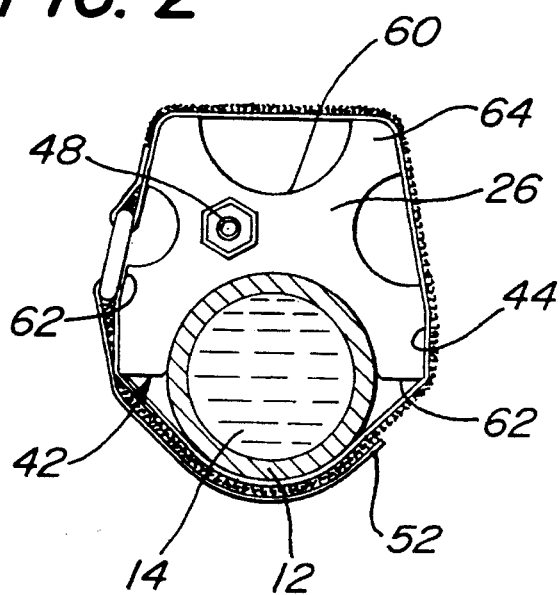
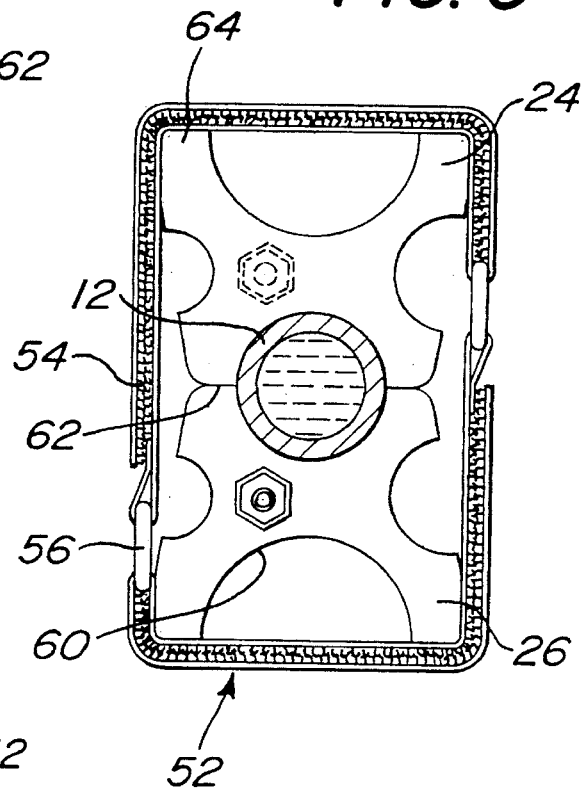
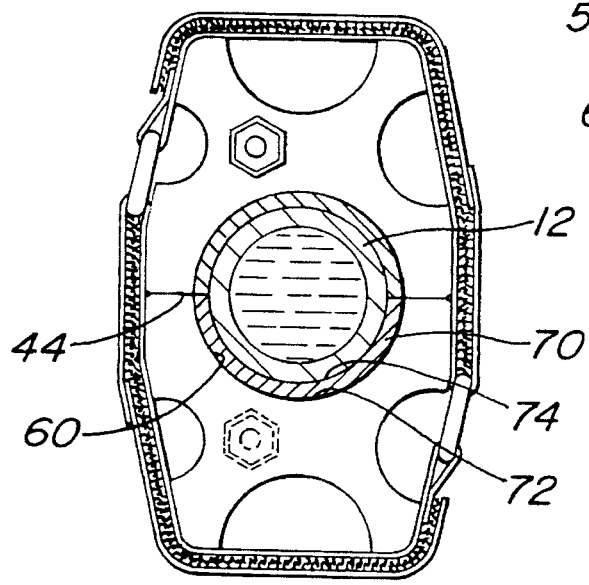

5,548,965

MULTI-CAVITY EVAPORATOR

FIELD OF THE INVENTION

This invention relates generally to the field of freezing the contents of pipes for working on the pipe and, more particularly, to apparatus and method for freezing the contents of various sizes pipes.

BACKGROUND OF THE INVENTION

In checking water, oil, gas or other pipe lines or conduits for leaks, or for other purposes, or for repairing or replacing pipe line sections it was at one time the practice to drain off part of the line, or to sever the pipe and cap the exposed end thereof with a plate or other similar cover. This is a time consuming and expensive procedure.

More recently the accepted method has been to freeze a section of the pipe, a water pipe, for instance, without cutting it or draining it of its contents; and therefore testing or repairing or working on that portion of the pipe line which is located "down stream" of the frozen pipe section. After the testing, repairs or pipe work or replacement has been completed, the section that was frozen and its contents are permitted to thaw thus resuming the flow of water through the pipe line as a whole.

One such method of freezing the contents of the pipe, was to use a pipe freezing device having a "U" shaped section or unit that straddled the pipe. The "U" shaped freezing unit acts as an evaporator and is connected to a conventional refrigeration system having a compressor, condenser and piping containing a metering device. The "U" shaped pipe freezing unit has a hollow chamber to which the refrigerant is pumped under pressure. In the interior space the refrigerant evaporates into a vapor state, also referred to as gas, and draws heat away from the pipe and then cools the contents in the pipe to below freezing temperature. The vapor passes out of the freezer unit and returns to the compressor. The space or gap between the pipe and the "U" shaped section is filled with a gel bag or water. The water and/or gel bag transfers the heat from the pipe. U.S. Pat. No. 4,309,875 discloses such a freezer, and is incorporated herein by reference.

One of the short comings of the prior freezing device is that water or some other freezable gel is needed to fill the space between the "U" shaped freezer unit and the pipe. It is desired to have an evaporator which would fit to various size pipes.

SUMMARY OF THE INVENTION

The present invention provides an evaporator having an outer surface and inner chamber. The outer surface having at least two pipe receiving surfaces and a pair of ends. The evaporator has a bore extending from one of the ends to the inner chamber. A tube extends into the bore sealing the chamber, such that a refrigerant flows into the inner chamber through an inner tube and out of the inner chamber through a space between the inner tube and an outer tube. Each of the pipe receiving surfaces having a distinct surface adapted for receiving different size pipes.

In a preferred embodiment, a pipe freezer refrigeration system has a pair of multi-cavity evaporators. Each evaporator has four pipe receiving surfaces each having a distinct radius of curvature concave surface and shaped to receive four distinct pipe sizes.

In a preferred embodiment, the pipe freezer refrigeration system has a sleeve having a convex surface adapted to be received by one of the concave surfaces of the evaporator and a concave surface adapted to receive a pipe of size distinct from that the evaporator individually is adapted to receive.

One object, feature and advantage of the invention resides in a single evaporator having multiple-cavities to receive various pipes therein not requiring a filler which is not as thermally conductive as the evaporator or the sleeve.

Further objects, features and advantages of the present invention will become more apparent to those skilled in the art as the nature of the invention is better understood from the accompanying drawings and detailed description.

BRIEF DESCRIPTION OF THE DRAWINGS

For the purpose of illustrating the invention, the drawings show a form of the invention which is presently preferred; it being understood, however, that the invention is not limited to the precise arrangement and instrumentality shown.

FIG. 2 is a sectional view of one of the evaporators on the pipe taken along line 2—2 of FIG. 1;

FIG. 3 is a sectional view of the pair of multi-cavity evaporators on a pipe of a smaller diameter than that of FIGS. 1 and 2.

FIG. 4 is a sectional view of the pair of multi-cavity evaporators on a pipe with a sleeve interposed;

DESCRIPTION OF THE PREFERRED EMBODIMENTS

Figure 1:
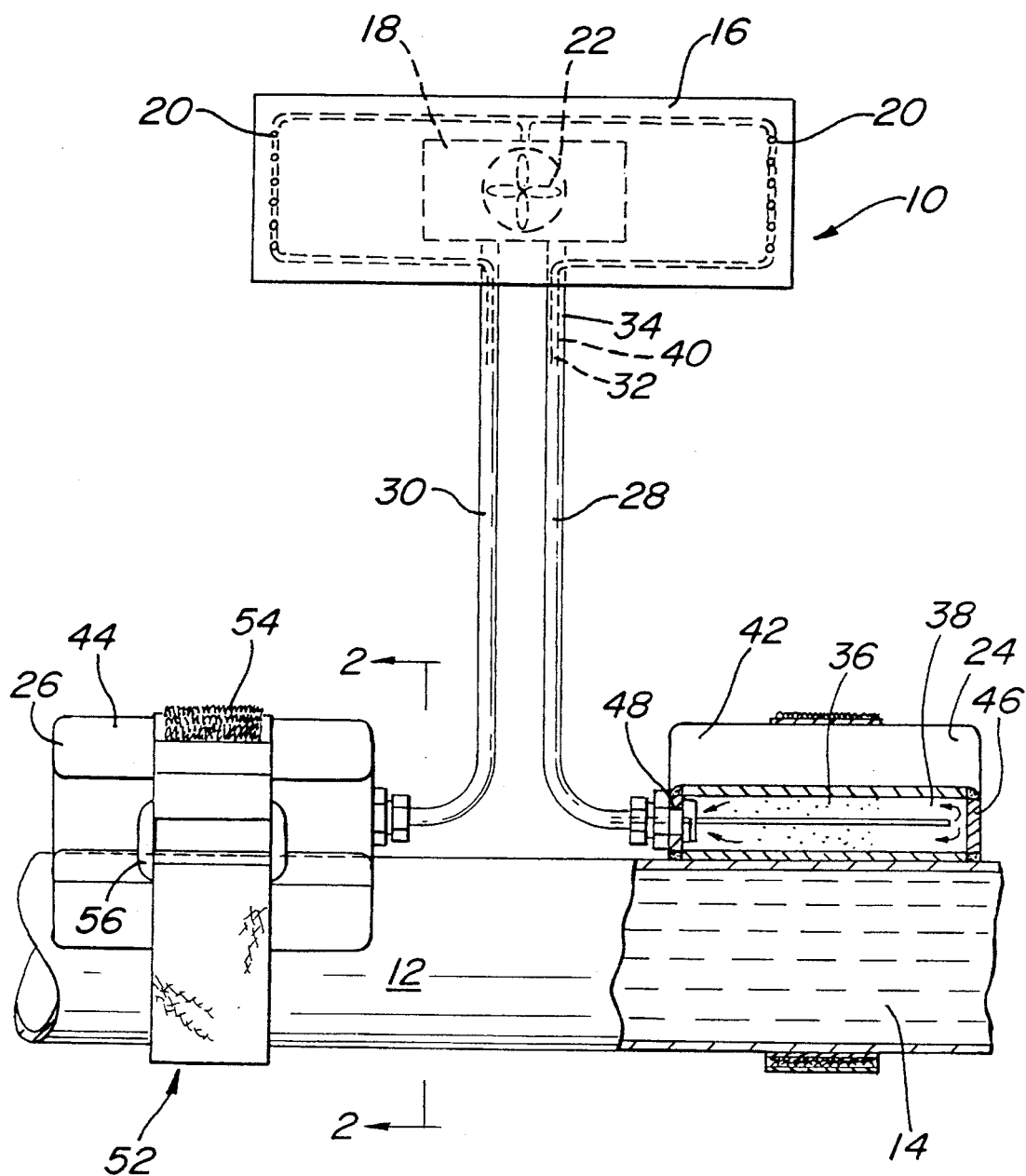
FIG. 1 is a schematic view of the system including a pair of multi-cavity evaporators, according to the invention. The multi-cavity evaporators are shown spaced from each other on a pipe. One of the multi-cavity evaporators is shown in section along with the associated section of pipe.

Referring to the drawings in detail, wherein like numerals indicate like elements, FIG. 1 illustrates a basic closed refrigeration system 10 of the invention, by which a pipe 12 is cooled to a point that its contents, such as water, 14 is frozen at locations of the pipe 12 to allow work on the pipe 12.

Referring to FIG. 1, the refrigeration system 10 has a portable unit 16. The portable unit 16 has a compressor 18, a pair of condensers 20, and a fan 22. The portable unit 16 is connected to a pair of multi-cavity evaporators 24 and 26, respectively. Evaporator 24 is connected to the unit 16 by a line 28. Evaporator 26 is connected by a line 30. Each of the lines 28 and 30 has a first, inner, tube 32 and a second, outer, tube 34.

A refrigerant 36, such as R-22 or more recently R-404a, circulates under pressure in the refrigeration system 10. In each cycle, the refrigerant is caused to change phase from liquid to vapor and back to liquid, absorbing heat from the pipe 12 through the evaporators 24 and 26 and releasing heat through the condensers 20.

More specifically, the subcooled liquid refrigerant 36 enters the evaporators 24 and 26 through the first tube 32 into an inner chamber of the evaporator 24 and 26. The first tube 32 acts as a metering device in the refrigerating system 10 to meter the high pressured liquid refrigerant 36 into a low pressure spray into the inner chamber 38 of the evaporators 24 and 26. As the refrigerant 36 enters the inner chamber 38 of the evaporators 24 and 26 as a subcooled liquid refrigerant, the refrigerant is allowed to evaporate and absorbs heat from the evaporator 24 and the adjacent pipe 12 and its fluid 14. The refrigerant therein vaporizes and is drawn from the inner chamber 38 through a space 40 between the inner tube 32 and the outer tube 34 by suction into the compressor 18, which compresses the vapor, thereby raising its pressure. The high pressure vapor passes through the condenser 20, in which the vapor is exposed to a large cooling surface area which is enhanced by the fan 22. The refrigerant 36 is cooled to the condensation temperature, releases its heat of condensation and changes phase back into a liquid at high pressure. In the preferred embodiment, the vapor from the evaporators 24 and 26 is sent through the lines 28 and 30 to a single compressor 18. The refrigerant 36 is split into two systems after being compressed and prior to entering the condensers 20.

Still referring to FIG. 1, the multi-cavity evaporators 24 and 26 are identical. Each evaporator has an outer surface 42 having a plurality of pipe receiving sides 44 and a pair of ends 46. The evaporator has a bore 48 extending from one of the ends 46 to the inner chamber 38, as seen with respect to evaporator 24. The line 28 extends through the bore 48 with the first, inner, tube 32 extending almost the entire length of the inner chamber 38. The second, outer, tube 34 extends just into the inner chamber 38.

Each of the evaporators 24 and 26 are secured to the pipe 12 by an adjustable fastener 52, such as a strap 54 having a hook and loop fastening mechanism, such a sold underneath the trade name VELCRO® and a metal ring 56.

The evaporators 24 and 26 are spaced apart on the pipe 12 so as to freeze the pipe 12 at two specific locations. A person, therefore, could work on the pipe at a location in between the two locations.

Referring to FIG. 2, a sectional view shows the evaporator 26 mounted on the pipe 12. The pipe receiving side 44 of the outer surface 42 of the evaporator 26 generally forms an isosceles trapezoid. Each pipe receiving sides 44 has a concave surface 60 and a pair of mounting edges 62. The concave surfaces 60 of the four pipe receiving sides are four distinct radiuses for receiving pipes of four distinct sizes.

In a preferred embodiment, the radius of curvature of the four concave surfaces are respectively 0.325", 0.450", 0.575", and 0.825". Therefore, the concave surfaces 60 are shaped to fit a 0.625" Outer Diameter (½" Inner Diameter), 0.875" O.D. (¾" I.D.), 1.125" O.D. ( 1" I.D.) and a 1.625" O.D. (1½" I.D.) diameter pipe respectively. The pipe 12 in FIG. 2 is a 1½" pipe (1½" I.D.×1.625" O.D.).

Still referring to FIG. 2, the mounting edges 62 and a portion of the concave surface 60 are part of a wing 64 which extends from a central region 66 of the evaporator 26. The central region 66 contains the inner chamber 38 through which refrigerant 36 flows. The wings 64 assist in the transferring heat from the pipe 12 to the refrigerant 36. The adjustable fastener 52 secures the evaporator 26 to the pipe 12.

FIG. 3 shows both evaporator 24 and evaporator 26 secure to the pipe 12 at one location. The refrigeration system 10 uses a pair of adjustable fasteners 52 to encircle the two evaporators 24 and 26. The two evaporators 24 and 26 may be used at one location in situations where the pipe 12 needs to be frozen only at one location. In that each concave surface 60 is an arc of 180°, a half circle, the mounting edges 62 of each of the evaporators 24 and 26 engage each other. By encircling the entire pipe 12, heat transfer is maximized.

Referring to FIG. 4, the refrigeration system 10 has a pair of sleeves 70. Each sleeve 70 has an outer convex surface 72 and an inner concave surface 74. The outer convex surface 72 is shaped to match the concave surface 60 of one of the pipe receiving sides 44. The inner concave surface 74 of the sleeve 70 receives a pipe 12 having a smaller diameter than the concave surface 60 of the pipe receiving side 44.

In a preferred embodiment, the sleeves 70 each have an 0.825" outer convex surface 72 and the inner concave surface has a radius of 0.700" for receiving a pipe having an outside diameter of 1.375" (1¼" dia. pipe is 1¼" I.D.×1.375" O.D.). The sleeve 70 therefore allows the multi-cavity evaporator 24 to work with five nominal diameter pipes.

Figure 5:
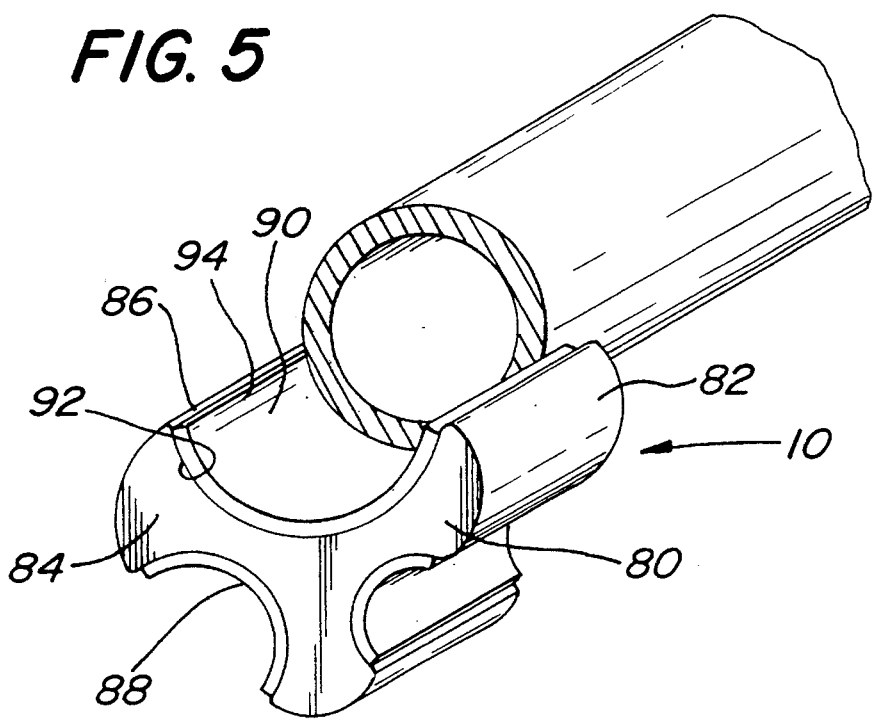
FIG. 5 is a perspective view of a tri-cavity evaporator on a larger pipe with an interposed sleeve.

Referring to FIG. 5, the refrigeration system 10, in addition, has a tri-cavity evaporator 80. The tri-cavity evaporator 80 can be used in place of multi-cavity evaporator 24. The tri-cavity evaporator 80 has an outer surface 82 with a pair of ends 84, only one shown, and a triplet of pipe receiving sides 86. The tri-cavity evaporator 80 similar to the multi-cavity evaporator 24 and 26, discussed above, has an inner chamber and a bore for accessing the inner chamber. Neither the inner chamber nor the bore is shown in FIG. 5. The bore is located on the end not showing. Each pipe receiving side 86 has a concave surface 88. The concave surfaces 88 each have a distinct radius of curvature for receiving a distinct pipe size.

In a preferred embodiment, the radius of curvature of the three concave surfaces are respectively 1.075", 1.575", and 2.075". Therefore, they are shaped to fit a 2", 3", and 4" inner diameter pipe (the O.D.'s of 2", 3", and 4" pipe are 2.125", 3.125", and 4.125" respectively). In contrast to the previous embodiment, the concave surface 88 does not extend for an arc of 180°. Similarly to the previous embodiment, the refrigeration system 10 has a sleeve 90 wherein the sleeve has an outer convex surface 92 and an inner concave surface 94. The outer convex surface 92 is shaped to match the concave surface 88 of the pipe receiving side 86. FIG. 5 shows a sleeve in two of the concave surfaces 88. It is recognized that if three sleeves were formed having outer convex surfaces of 1.075", 1.575", and 2.075" to fit the respective concave surfaces 88 and inner concave surfaces 0.825", 1.325" and 1.825" that the tri-cavity evaporator 80 could be used for pipes having 1½", 2", 2½", 3", 3½ and 4" I.D. The O.D.'s of 1½, 2, 2½, 3, 3½ and 4 inch diameter pipes are 1.625", 2.125", 2.625", 3.125", 3.625" and 4.125" respectively.

Figure 6:
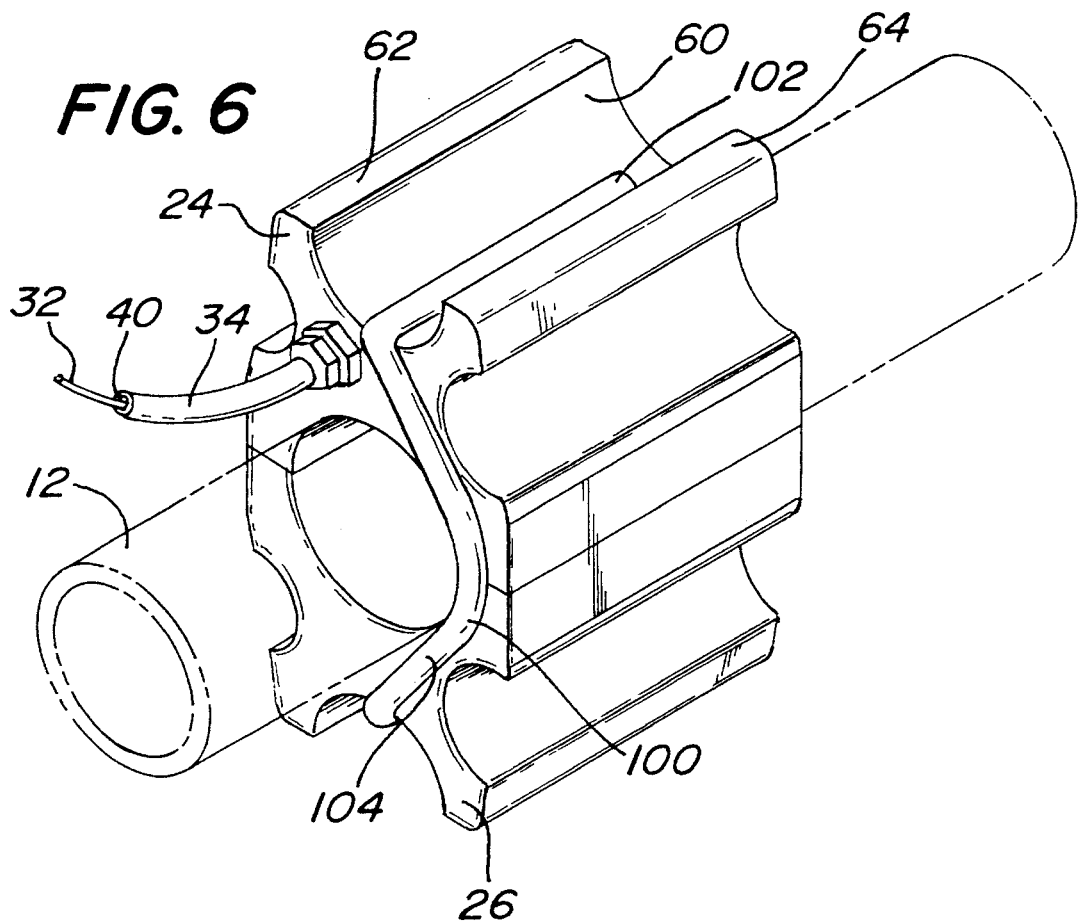
FIG. 6 is a perspective view of a pair of multi-cavity evaporators mounted on a pipe by a metal clip.

Referring to FIG. 6, the multi-cavity evaporators 24 and 26 are shown mounted on a pipe 12, using a bracket 100. The bracket 100 has a pair of legs 102 only one shown, which slides into snug engagement with a concave surface 60 which is not receiving the pipe 12. The bracket 100 has a curved base 104 to go around the pipe 12, shown in phantom, in between the legs 102. It is recognized that it might be easier for a single contractor to hold the two evaporators 24 and 26 to the pipe and slip the bracket rather than using the adjustable fastener 52.

It is recognized that a layer of water can be sprayed between the pipe and the evaporator to assist in transferring heat from the pipe to the evaporator.

The invention may be embodied in other specific forms without departing from the spirit or central attributes thereof. Accordingly, reference should be made to the claims, rather than to the foregoing specification, as indicating the scope of the invention. It is recognized that the language "multi-cavity" could be used to refer to multi-cavity evaporators 24 and 26, the tri-cavity evaporator 80 and other multi-cavity evaporators.

What is claimed is:

1. An evaporator for freezing the contents of a pipe through use of a refrigerant, the evaporator comprising:

an outer surface having a plurality of pipe receiving surfaces and at least one end surface;

an inner chamber;

a bore extending from the end surface to the inner chamber for transporting the refrigerant into and out of the inner chamber;

the pipe receiving surfaces each having a concave surface for receiving the pipe, the concave surfaces having distinct radius of curvature for receiving different size pipes.

2. An apparatus for freezing the contents of a pipe using a refrigerant, the apparatus comprising a compressor for compressing the refrigerant from a low pressure to a high pressure;

a condenser downstream of the compressor for condensing the refrigerant from a high temperature gas to a lower temperature liquid;

an evaporator;

a first tube extending between the condenser and the evaporator for moving the refrigerant to the evaporator;

a second tube encircling the first tube for at least a portion of the tube, the second tube extending between the compressor and the evaporator for moving the refrigerant from the evaporator to compressor;

the evaporator having an outer surface and inner chamber, the outer surface having at least two pipe receiving surfaces and a pair of ends, the evaporator having a bore extending from one of the ends to the inner chamber, the second tube extending into the bore sealing the chamber, such that the refrigerant flows into the inner chamber through the first tube and out of the inner chamber through the second tube;

each of the pipe receiving surfaces having a distinct surface adapted for receiving different size pipes.

3. An apparatus as in claim 2, wherein each of the pipe receiving surface has a concave surface adapted for receiving a pipe.

4. An apparatus as in claim 3, wherein the evaporator has four pipe receiving surfaces, each of the concave surface of the pipe receiving surfaces having a specific distinct radius of curvature.

5. An apparatus as in claim 4, wherein the concave surface has an arc of approximately 180°.

6. An apparatus as in claim 5, wherein the pipe receiving surface further comprising mounting surfaces on each side of the concave surface.

7. An apparatus as in claim 3, wherein the evaporator has three pipe receiving surfaces, each of the concave surface of the pipe receiving surfaces having a specific distinct radius of curvature.

8. An apparatus as in claim 3, further comprising a sleeve having an outer surface and an inner surface, the outer surface being convex and complimentary to one of the concave pipe receiving surfaces of the evaporator and the inner surface being concave having a specific distinct radius different from those of the evaporator and adapted to receive the pipe.

9. An apparatus as in claim 3, further comprising an adjustable fastening mechanism for securing the evaporators to the pipe.

10. An apparatus as in claim 3, further comprising a second evaporator generally identically to the first evaporator, the concave surface has an are of approximately 180° and the evaporators having mounting surfaces on each side of the concave surfaces adapted to engage the mounting surfaces of the other evaporator therein encircling the pipe.

11. An apparatus as in claim 10, further comprising a bracket having a pair of legs, the legs each received by one of the concave surfaces of respective evaporators for securing the evaporators into engagement around the pipe.

12. An apparatus as in claim 10, further comprising an adjustable fastening mechanism for securing the evaporators to the pipe.

13. A method of freezing the contents of a pipe comprising the following steps:

providing a refrigeration system having a compressor, a condenser, and a multi-cavity evaporator having at least two pipe receiving surfaces, each pipe receiving surface having a concave surface;

selecting the proper pipe receiving surface having the concave surface for receiving the pipe;

securing the evaporator to the pipe such that the proper concave surface engages the pipe;

circulating a refrigerant through the refrigeration system therein reducing the temperature of the evaporator and pipe and freezing the contents of the pipe.

14. A method of freezing the contents of a pipe as in claim 13 wherein the refrigeration system has a second multi-cavity evaporator and comprising the following step of securing the evaporators to the pipe such that the proper concave surfaces engage the pipe and the evaporators engage each other.

15. A method of freezing the contents of a pipe as in claim 13 wherein the refrigeration system has a second multi-cavity evaporator and comprising the following step of securing the evaporators to the pipe such that the proper concave surfaces engage the pipe and the multi-cavity evaporators are spaced from each other on the pipe.

\* \* \* \* \*